United States Patent [19]

Bullock

[11] Patent Number: 5,786,758
[45] Date of Patent: Jul. 28, 1998

[54] VEHICLE LOCATOR SYSTEM

[75] Inventor: John H. Bullock, Baton Rouge, La.

[73] Assignee: J.B.'s Car Finder Corporation, Baton Rouge, La.

[21] Appl. No.: 526,217

[22] Filed: Sep. 11, 1995

[51] Int. Cl.$^6$ .................................... G08B 1/08
[52] U.S. Cl. .................. 340/539; 340/426; 340/425.5; 340/468; 340/471; 340/473; 340/571; 340/572; 116/202; 116/209
[58] Field of Search .................. 340/571, 572, 340/539, 426, 425.6, 468, 471, 473; 116/202, 209

[56] References Cited

U.S. PATENT DOCUMENTS

| | | | |
|---|---|---|---|
| 2,324,614 | 7/1943 | Dalton | 340/468 |
| 2,686,492 | 8/1954 | Taylor | 34/426 |
| 3,036,545 | 5/1962 | Legg | 340/571 |
| 3,114,129 | 12/1963 | Gilbert | 340/473 |
| 3,136,289 | 6/1964 | Johnson | 340/573 |
| 3,363,600 | 1/1968 | Gary | 116/173 |
| 3,387,584 | 6/1968 | Glantz | 116/173 |
| 3,540,406 | 11/1970 | Dexter | 116/28 |
| 4,052,697 | 10/1977 | Daifotes | 340/87 |
| 4,574,726 | 3/1986 | Sullivan | 116/28 |
| 4,598,272 | 7/1986 | Cox | 340/571 |
| 4,964,360 | 10/1990 | Henry | 116/28 |
| 4,976,410 | 12/1990 | Tomaiuolo | 248/514 |
| 4,977,849 | 12/1990 | Brinton | 116/28 |
| 5,089,803 | 2/1992 | Bohn | 340/425.5 |
| 5,140,933 | 8/1992 | Nishina et al. | 116/209 |
| 5,233,938 | 8/1993 | Lalo | 116/173 |

Primary Examiner—Jeffery Hofsass
Assistant Examiner—Daryl C. Pope
Attorney, Agent, or Firm—Mark E. Wiemelt

[57] ABSTRACT

This invention provides an improved vehicle locator system (10) combining a remote transmitting unit (20) and a vehicle mounted receiving unit (50) which actuate a light source (58) mounted on a vehicle's exterior to facilitate location of the vehicle by the operator in a crowded or dimly lit parking lot, garage, or the like. The system is also capable of selectively actuating the vehicle's horn. The receiving unit (50) includes a generally U-shaped clip (78) having a first and second facing, generally planar panels (80) & (82) adapted to engage the inner and outer faces, respectively, of a vertically adjustable, moveable vehicle window. The panels (80) & (82) are joined along a common bight (84) with the distance between the panels (80) & (82) being less than the thickness of the window to assure secure frictional engagement with the window as the clip (78) is seated over the top edge of the partially lowered vehicle window. A second housing (64) containing a receiver (52) is attached to the first panel (80) and the second panel (82) has a generally laterally extending portion (86) provided with a light source (58) at the end of a substantially cylindrical member (62) extending generally vertically upwardly beyond the roof of the vehicle. The second housing (64) is contained within the interior of the vehicle and the light source (58) is disposed on the exterior of the vehicle when the clip (78) is seated over the top edge of the partially lowered window and the window is raised to a substantially closed position.

1 Claim, 4 Drawing Sheets

NOTES: (UNLESS OTHERWISE SPECIFIED)
1.- ALL RESISTORS ARE 1/4 WATT, 5%.
2.- ALL CAPACITORS ARE IN MICROFARADS.

VEHICLE LOCATOR SYSTEM

BACKGROUND OF THE INVENTION

The present invention relates generally to a new and improved vehicle locator system, and in particular to a system which may be easily mounted to a conventional, vertically adjustable, moveable vehicle window and includes a light which is easily discernible a distance from the vehicle when activated and the combination of a remote transmitting unit and vehicle mounted receiving unit which actuate the light to facilitate location of the vehicle by the operator in a crowded or dimly lit parking lot, garage, or the like. The combination remote transmitting unit and vehicle mounted receiving unit are also capable of selectively actuating the vehicle's horn.

Numerous devices have heretofore been proposed for providing vehicle locator devices. However, each of the prior art devices have been found wanting in one or more particulars.

The invention of this application represents a recent innovation in the art which overcomes the deficiencies of the prior art.

SUMMARY OF THE INVENTION

It is an object of the present invention to provide an improved vehicle locator system.

More specifically, it is an object of the present invention to provide an improved vehicle locator system which includes the combination of a remote transmitting unit and vehicle mounted receiving unit which are capable of actuating a light mounted on the vehicle, the vehicle's horn, or both.

It is another object of the present invention to provide a vehicle locator system in accordance with the foregoing objects which provides a receiving unit including a mounting means which positions the receiving unit inside the vehicle's interior and the light on the vehicle's exterior.

It is yet another object of the present invention to provide a vehicle locator system in accordance with the foregoing objects which utilizes the vehicle's battery as its power source.

It is still another object of the present invention to provide a receiving unit in accordance with the foregoing objects which includes a self-contained power source.

It is a further object of the present invention to provide a vehicle locator system in accordance with the foregoing objects which includes a magnetic mounting means.

It is a further object of the present invention to provide a vehicle locator system in accordance with the foregoing objects which is simple in design, inexpensive to manufacture, portable and lightweight.

It is therefore an object of the present invention to provide a new and improved vehicle locator system which has all the advantages of the prior art and none of its disadvantages.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

A broad aspect of the invention involves an improved vehicle locator system which provides a remote transmitting unit which includes a transmitter and a first power source contained in a first housing. An activation switch is mounted on the exterior of the first housing and is connected to the transmitter. The transmitter circuitry generates and emits a signal when the activation switch is closed.

The system also includes a receiving unit having a mounting means for mounting the receiving unit on the vehicle and having a receiver contained in a second housing and being connectable to a second power source. The receiving unit is disposed and adapted to receive the signal emitted from the transmitting unit. A light source is connected to the receiving unit. The light source is energized by the second power source and are disposed to emit light fluxes generally radially outwardly from the vehicle as the receiving unit receives the signal from the transmitting unit and actuates the light source.

A somewhat more limited aspect of the invention involves the aforementioned system in which the mounting means comprises a generally U-shaped clip having a first and second facing, generally planar panels adapted to engage the inner and outer faces, respectively, of a vertically adjustable, moveable vehicle window. The panels are joined along a common bight with the distance between the panels being less than the thickness of the window to assure secure frictional engagement with the window as the clip is seated over the top edge of the partially lowered vehicle window. The second housing is attached to the first panel and the second panel has a generally laterally extending portion provided with the light source. The second housing is contained within the interior of the vehicle and the light source is disposed on the exterior of the vehicle when the clip is seated over the top edge of the partially lowered window and the window is raised to a substantially closed position.

Another limited aspect of the present invention involves the use of a substantially cylindrical member having a first end connected to the light source and a second end connected to the generally laterally extending portion of the second panel. The cylindrical member extends generally vertically upwardly when the clip is seated over the top edge of the partially lowered window and the window is raised to a substantially closed position. The cylindrical member is of sufficient length so that the light sources are disposed generally vertically above the roof of the vehicle. The light sources may be seen by the vehicle operator located a distance from the vehicle as the light sources are actuated by the transmitting unit and the receiving unit.

Still another aspect of the present invention involves the use of an incandescent light bulb as the light source. The incandescent light bulb has a base adapted to connectably fit an electrical socket positioned at the first end of the member. The electrical socket is connected to an electric cord having a suitable plug on an end for detachable electrical engagement with the cigarette lighter socket of the vehicle.

Yet another aspect of the present invention involves the aforementioned system which further includes electrical leads which connect the receiving unit to the vehicle's horn. A selector switch may be connectable to the leads so that the horn can be selectively enabled.

There has thus been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the claims appended hereto.

Those skilled in the art will appreciate that the conception, upon which this disclosure is based, may readily be utilized as a basis for the designing of other devices for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Corresponding reference numerals indicate corresponding parts throughout the several views of the drawings.

DETAILED DESCRIPTION OF THE PREFERRED EMBODIMENT

Figure 1:
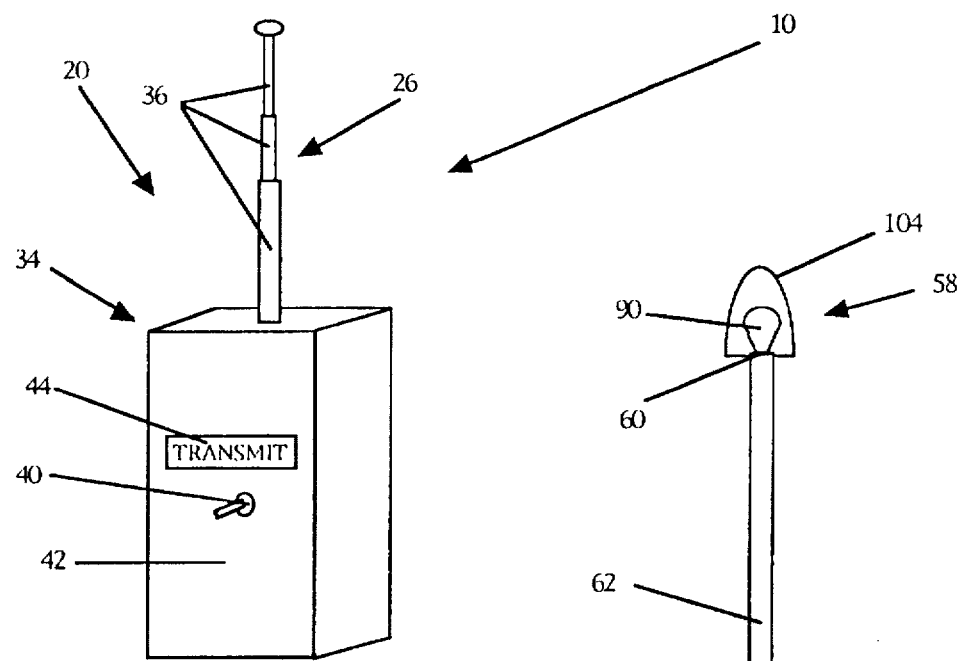
FIG. 1 is a perspective view of a transmitting unit constructed according to the principles of the present invention.

Referring now to the drawings in detail there is illustrated a vehicle locator system constructed in accordance with the principles of the present invention.

To illustrate the invention, FIGS. 1–4 show a preferred embodiment illustrating the vehicle locator system 10 including a remote transmitting unit in combination with a receiving unit, designated generally by their entirety by the reference numerals 20 and 50, respectively, in FIGS. 1–4.

Figure 5:
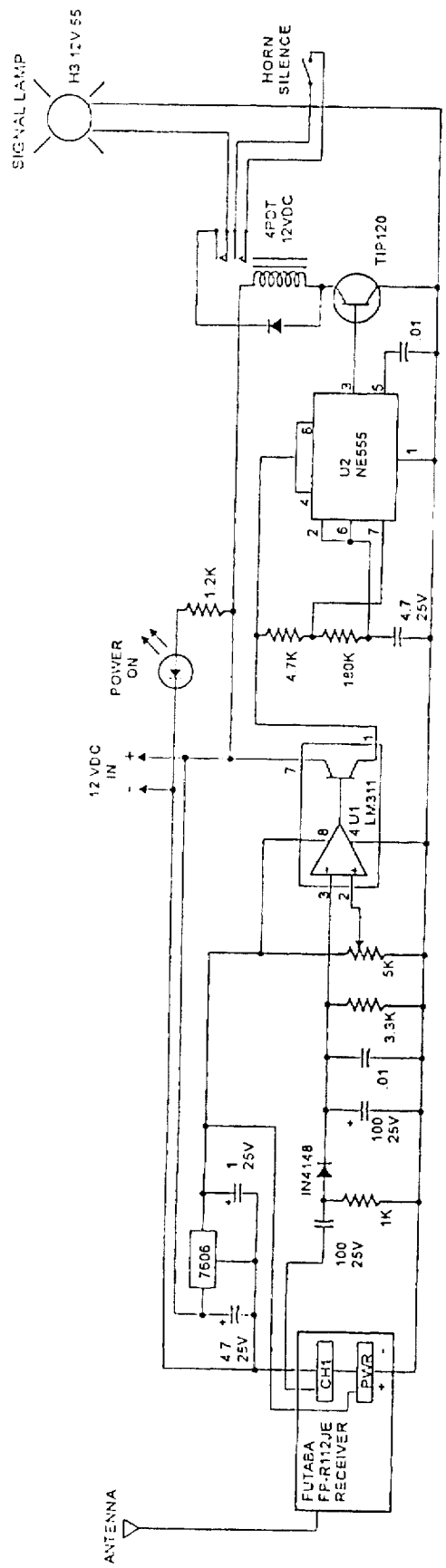
FIG. 5 is a schematic diagram of receiver circuitry associated with an embodiment of the present invention.
Figure 6:
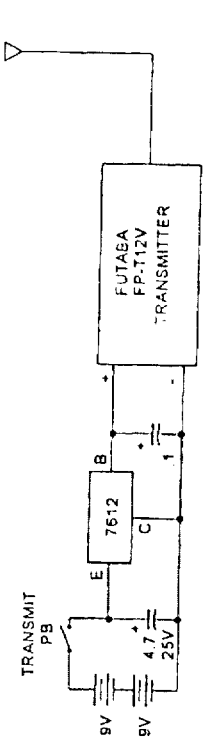
FIG. 6 is a schematic diagram of transmitter circuitry associated with an embodiment of the present invention.

The preferred remote transmitting unit 20 shown in FIG. 1 includes a transmitter 22 whose associated transmitter circuitry 24 is shown in FIG. 5 and 6, a transmitter antenna 26, and a first power source 28 which includes a battery unit 30, and discharge control circuitry 32 used to power conventional transmitting devices. The battery unit 30 of the preferred embodiment includes two 9-volt Nickel-Cadmium batteries which are commercially available from a variety of sources. The transmitter 22 is also of the type commercially available from several sources and is capable of generating and emitting a signal which is received by the receiving unit 50 located within a certain radius of the transmitting unit 20. However, the preferred transmitter 22 is available from Futaba Corporation of America, in Irvine, Calif., specifically part number FP-T2V.

The transmitting unit 20 is contained within a metal first housing 34 having generally rectangular sides, although it will readily be understood by those skilled in the art that the first housing 34 may be of varying sizes, shapes, forms, materials or construction.

The transmitter antenna 26 includes generally cylindrical, telescoping elements 36, each of which is respectively slightly larger than the other so that each of the successively larger elements 36 can be slid on the outside surfaces of the successively smaller elements 36. Crimped stops (not shown) are disposed at the respective ends of the elements 36 to prevent them from being slid off one another when they are extended in operation. The preferred transmitting unit 20 includes an activation switch 40 disposed on an exterior face 42 of the first housing 34. The preferred transmitting unit 20 also includes an engraved plate 44 which is associated with the activation switch 38 and disposed on the exterior face 42 of the first housing 34 and which contains the word "TRANSMIT."

Figure 2:
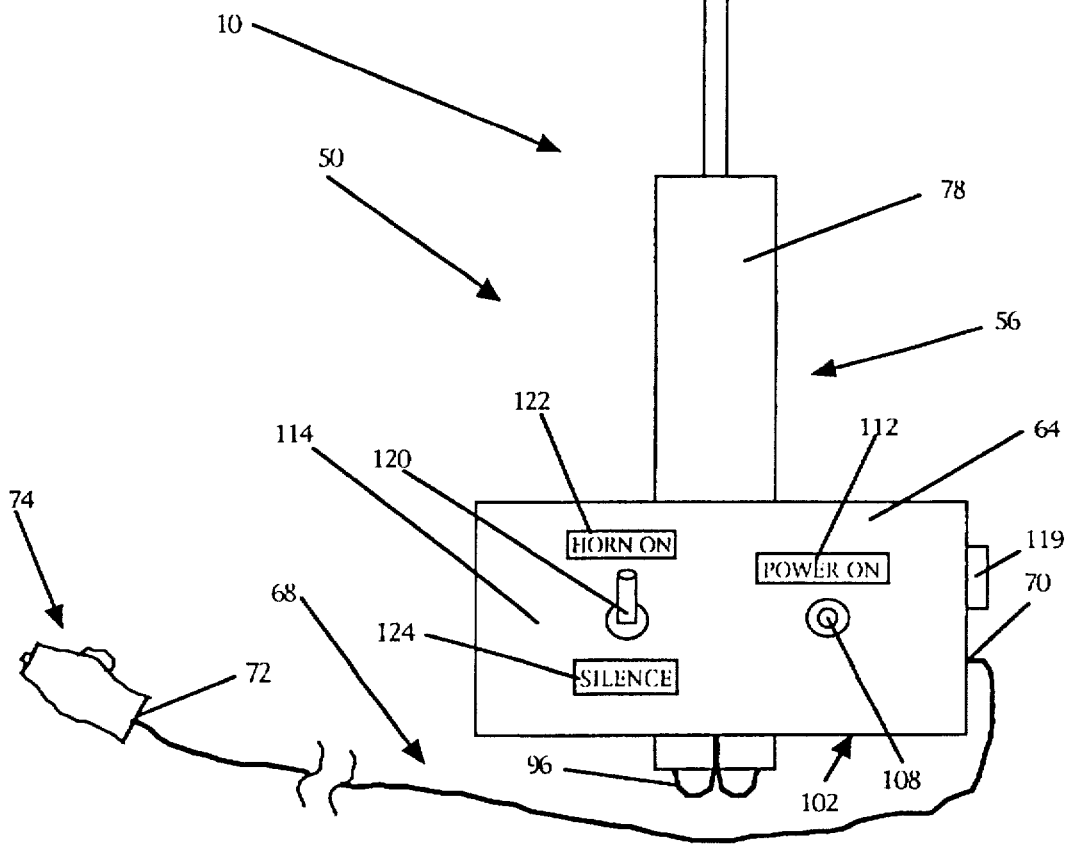
FIG. 2 is a front view of a receiving unit constructed according to the principles of the present invention.
Figure 3:
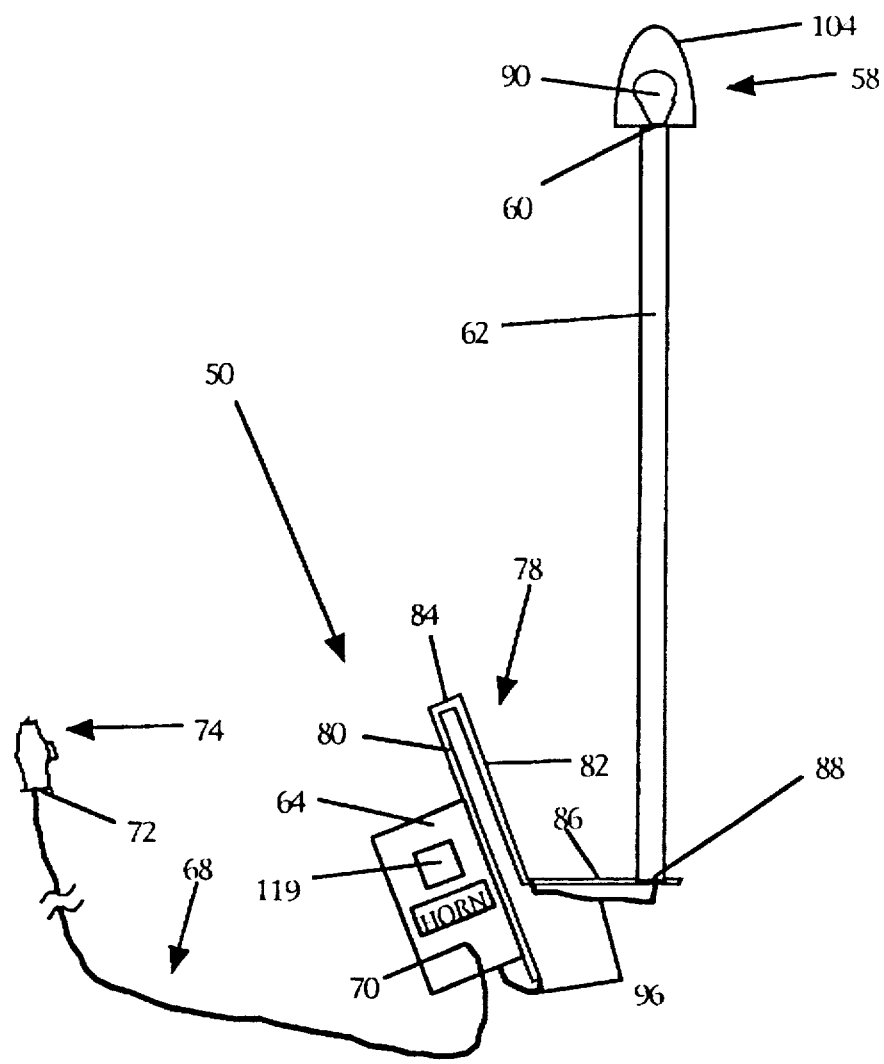
FIG. 3 is a side view of a receiving unit constructed according to the principles of the present invention.
Figure 4:
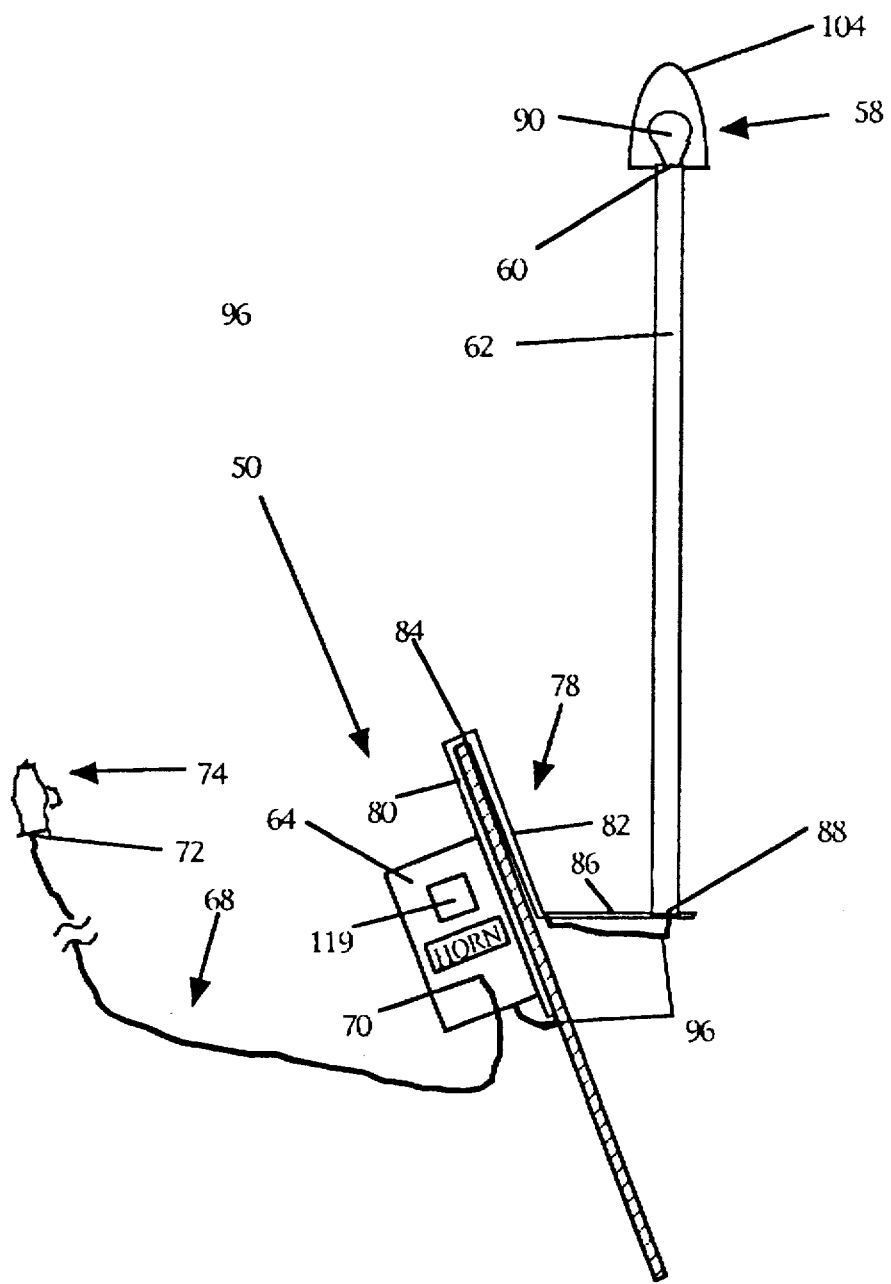
FIG. 4 is a side view of a receiving unit constructed according to the principles of the present invention illustrating a U-shaped clip mounting means seated over the top edge of a vehicle window, in transverse section, and engaging both the interior and exterior faces thereof.

The preferred receiving unit 50 shown in FIGS. 2–4 includes a receiver 52 including associated receiver circuitry 54 as shown in FIG. 5, a mounting means 56 for mounting the receiver 52 on a vehicle, a light source 58 disposed on the first end 60 of a substantially cylindrical member 62 and connected to the receiver 52, and a second power source. The preferred receiving unit 50 is contained within a metal second housing 64 having generally rectangular sides 66, although it will readily be understood by those skilled in the art that the housing may be of varying sizes, shapes, forms, materials or construction. However, the preferred receiver 52 is available from Futaba Corporation of America, in Irvine, Calif., specifically part number FPR112J-E.

An electric cord 68 is connected on its first end 70 to the receiver circuitry 54 and its second end 72 is provided with a plug 74 which is suitable for detachable engagement with the cigarette lighter or power port of a vehicle so that the receiver 52 is powered by the vehicle's battery which acts as the second power source 63. Alternatively, the receiving unit 50 may include a conventional self-contained battery pack (not shown) which is contained in the second housing 64 and which acts as the second power source 63.

The mounting means 56 of the preferred embodiment includes a generally U-shaped clip 78 having a first and second facing, generally planar panels 80 & 82 adapted to engage the inner and outer faces, respectively, of a vertically adjustable, moveable vehicle window. The panels 80 & 82 are joined along an integrally formed common bight 84 with the distance between said panels 80 & 82 being less than the thickness of the vehicle's window to assure secure frictional engagement with the window as the clip 78 is seated over the top edge of the partially lowered vehicle window. The first panel 80 is attached to a side 66 of the second housing 64. The second panel 82 includes a generally laterally extending portion 86.

The first end 60 of the substantially cylindrical member 62 is provided with the light source 58 and a second end 88 of the cylindrical member 62 is connected to the generally laterally extending portion 86 of the second panel 82. The cylindrical member 62 extends generally vertically upwardly when the clip 78 is seated over the top edge of the partially lowered window and the window is raised to a substantially closed position. The cylindrical member 62 is of sufficient length so that the light source 58 is disposed generally vertically above the roof of the vehicle, whereby the light source 58 may be seen by the vehicle operator located a distance from the vehicle as the light source 58 is actuated by the transmitting unit 20 and the receiving unit 50.

The light source 58 of the preferred embodiment is a conventional incandescent light bulb 90 having a base (not shown) adapted to connectably fit an electrical socket (not shown) positioned at the first end 60 of the member 62. The electrical socket (not shown) is connected to the receiver circuitry 54 by wiring 96 which extends through the interior of the cylindrical member 62 through a hole (not shown) in the laterally extending portion 86 of the second panel 82 and through an aperture (not shown) in the bottom 102 of the second housing, 64.

Alternatively, the light source 58 may be a halogen light, a fuse lamp, a vacuum fluorescent lamp, or a light emitting diode 110.

The preferred embodiment includes a transparent plastic hood 104 mounted on the first end 60 of the cylindrical member 62 and enclosing the light source 58 in order to protect the bulb 90 and electrical connections (not shown) of the electrical socket (not shown) from the weather.

The preferred embodiment also includes an indicator light 108 mounted on the exterior of the second housing 64 and being connected to the receiver 52 so that the indicator light 108 is actuated when the receiver 52 is connected to the second power source 63. The indicator light 108 of the preferred embodiment is a light emitting diode 110. The preferred receiving unit 50 also includes a first engraved plate 112 which is disposed on the exterior face 114 of the second housing 64 and associated with the indicator light 108 and which contains the words "POWER ON."

As an alternative to the preferred mounting means 56, a magnetic core (not shown) embedded in the second housing 64 may be utilized to attach the second housing 64 to the exterior of the vehicle.

The preferred embodiment also includes electrical connector ports 119 which are disposed within a sidewall of the second housing 64 and connected to the receiver 52. Leads (not shown) are connectable between the vehicle's horn and the ports 119, so that the horn is actuated when the receiving unit 50 receives the signal from the transmitting unit 20. The receiving unit 50 further includes a selector switch 120 disposed on the exterior face 114 of the second housing 64. The selector switch 120 is connected to the receiver 52 and ports 119 so that the horn can be selectively enabled. The preferred receiving unit 50 also includes a second and third engraved plates 122 & 124 which are disposed on the exterior face 114 of the second housing 64 and associated with the selector switch 120. The engraved plates 122 & 124 contains the words "HORN ON" and "SILENCE," respectively.

OPERATION

In operation, the vehicle is parked in a parking lot, garage, or the like, the U-shaped clip 78 of the receiving unit 50 is seated over the top edge of a partially lowered window so that the second housing 64 is contained within the interior of the vehicle and the light source 58 is disposed on the exterior of the vehicle, and the window is raised to a substantially closed position. The plug 74 is detachably engagement with the cigarette lighter or power port of the vehicle so that the indicator light 108 is actuated. The leads may then be connected to the receiving unit 50 and the selector switch 120 may be placed in the "HORN ON" position enabling the horn.

When the operator desires to locate the vehicle, the transmitter antenna 26 is extended and the activation switch 40 is depressed by the operator causing a signal to be emitted from the transmitting unit 20. The signal is received by the receiving unit 50 and actuates the light source 58 and the vehicle's horn so that the operator may easily locate his or her vehicle in a crowded or dimly lit parking lot, garage, or the like. It should readily be understood by those skilled in the art that the receiving unit 50 itself acts as the receiver antenna 126 in connection with the receiver circuitry 54.

The leads may alternatively remain disconnected or the selector switch 120 may be placed in the "SILENCE" position so that only the light source 58 is actuated.

While the invention has been described in connection with a preferred embodiment and several alternative embodiments, it will be understood that it is not intended that the invention be limited to those embodiments. On the contrary, it is intended to cover all alternatives, modifications and equivalents as may be included within the spirit and scope of the invention as defined by the appended claims.

In view of the above, it will be seen that the several objects of this invention are achieved and other advantageous results are obtained.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered illustrative of only the principles of the invention. Further, since numerous modifications and changes will readily occur to those skilled in the art, it is not desired to limit the invention to the exact construction and operation shown and described, and accordingly, all suitable modifications and equivalents falling within the scope of the invention may be employed.

I claim:

1. A vehicle locator system comprising:

a remote transmitting unit having a transmitter and a first power source contained in a first housing;

an activation switch mounted on the exterior of said first housing and connected to said transmitter, whereby said transmitter generates and emits a signal when said activation switch is closed;

a receiving unit mountable on the exterior of a vehicle and having a receiver contained in a second housing and being connectable to a second power source, said receiving unit being disposed and adapted to receive said signal emitted from said transmitting unit;

one or more light sources connected to said receiving circuitry, said one or more light sources being energized by said second power source and disposed to emit light fluxes generally radially outwardly from the vehicle as said receiving unit receives said signal from said transmitting unit and actuates said one or more light sources;

leads connectable between the vehicle's horn and said receiver, so that the horn is actuated when said receiving unit receives said signal from said transmitting unit; and a selector switch, said selector switch being connected to said leads so that the horn can be selectively enabled.

* * * * *